T. D. Hawley,

Grain Shovel.

No. 91,440. Patented June 15, 1869.

Attest:
H. F. Eberts
Jas. J. Day

Inventor:
Thomas D. Hawley
Per Attorney
Thos. A. Sprague

United States Patent Office.

THOMAS D. HAWLEY, OF DETROIT, MICHIGAN.

*Letters Patent No. 91,440, dated June 15, 1869.*

IMPROVEMENT IN APPARATUS FOR SHOVELLING GRAIN.

The Schedule referred to in these Letters Patent and making part of the same.

*To whom it may concern:*

Be it known that I, THOMAS D. HAWLEY, of Detroit, in the county of Wayne, and State of Michigan, have invented a new and useful Improvement in an Apparatus for Shovelling Grain; and I do declare that the following is a true and accurate description thereof, reference being had to the accompanying drawings, and to the letters of reference marked thereon, and being a part of this specification, in which—

Like letters refer to like parts in each figure.

Figure 1:
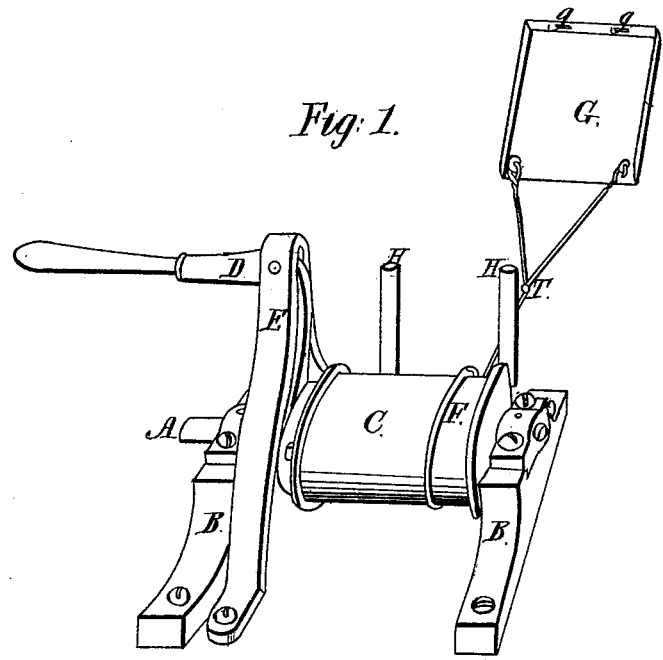
Figure 1 is a perspective view of my improvement.
Figures 2, 3:
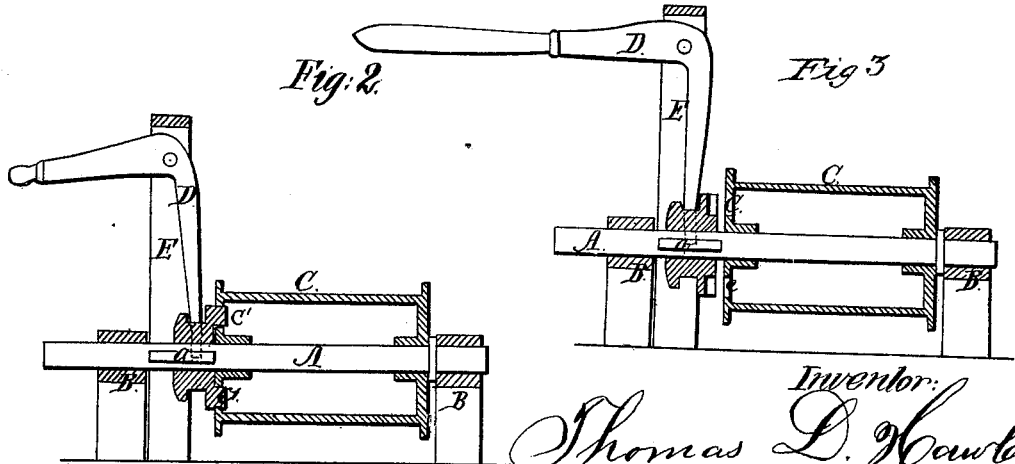
Figure 2 is a longitudinal section through the drum, showing it in gear with the clutch feathered on the shaft.
Figure 3 is the same, out of gear.

The nature of this invention relates to an improved method of shovelling grain or malt, on a malting-floor, by machinery, and consists in the employment of a clutched drum-sleeve on a revolving shaft, with which it is thrown in or out of gear, for winding on said drum a rope attached to a large shovel or scoop, for gathering up and carrying the grain to the leg of an elevator, or into a malting-kiln, near which the drum is placed. With one man or boy to operate the clutch, and another to work the scoop, I am enabled to do the work of six men in a given time.

In the drawings—

A represents a shaft, rotating in bearings in standards B, placed at one side of the room near the leg of an elevator, or the entrance to the kiln.

On this shaft is loosely sleeved a drum, C, provided at one end with a clutch, $c$, with which engages a sliding clutch, $c'$, rotated by a feather, $a$, on the shaft A.

This clutch is moved laterally on the shaft, by means of a clutch-lever, D, pivoted in the standards E, and communicates the motion of the shaft to the drum when desired.

F is a rope or chain, one end of which is secured to the drum C, and the other, to the bail of a shovel or scoop G, resembling a large road-scraper, the back edge of which is provided with handles or hand-holes $g$, for conveniently operating it. The scoop may be made of wood, and faced with metal, or entirely of metal, but should be light, to be easily carried.

Its operation may be explained as follows:

The clutch being out of gear with the drum, an attendant carries the scoop to the further side of the room, uncoiling the rope from the drum; he then allows the front edge of the scoop to rest on the floor, over which the malt or grain is spread. The attendant at the clutch then throws the clutch into gear with the drum, which, revolving, winds up the rope, and draws the scoop towards it, the shoveller holding and guiding it by the hand-holes $g$, and carrying several bushels of malt or grain toward the drum. Upon reaching the proper point, the drum is thrown out of gear, and the operation is repeated. To prevent the rope from running off the drum, when drawing grain from a corner of the floor, the posts H are placed in front of the drum, to guide the rope to it in a direct line.

What I claim as my invention, and desire to secure by Letters Patent, is—

In apparatus for shovelling and conveying malt or grain, the combination of the scoop G, rope F, and clutched drum C, with the clutch $c'$, rotated by a shaft, A, and the guiding-posts H, when constructed, arranged, and operating substantially as and for the purposes herein set forth.

THOMAS D. HAWLEY.

Witnesses:
H. F. EBERTS,
JAS. I. DAY.